United States Patent
Yamashita

(10) Patent No.: US 7,171,949 B2
(45) Date of Patent: Feb. 6, 2007

(54) IGNITION TIMING CONTROLLER FOR INTERNAL COMBUSTION ENGINE

(75) Inventor: Yukihiro Yamashita, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/222,768

(22) Filed: Sep. 12, 2005

(65) Prior Publication Data
US 2006/0060176 A1    Mar. 23, 2006

(30) Foreign Application Priority Data
Sep. 17, 2004   (JP) ............................. 2004-270868

(51) Int. Cl.
*F02P 5/00*   (2006.01)
*F02P 5/04*   (2006.01)

(52) U.S. Cl. ................................. 123/406.59

(58) Field of Classification Search ........... 123/406.59, 123/406.58, 406.53
See application file for complete search history.

(56) References Cited

U.S. PATENT DOCUMENTS

| 4,085,714 A | * | 4/1978 | Hattori et al. .......... 123/406.66 |
| 4,838,228 A | * | 6/1989 | Yoneyama ............. 123/406.35 |
| 5,271,367 A | * | 12/1993 | Abe ....................... 123/406.55 |
| 2006/0081203 A1 | * | 4/2006 | Izumi et al. ............. 123/90.17 |

FOREIGN PATENT DOCUMENTS

JP     4-362275     12/1992

* cited by examiner

*Primary Examiner*—Mahmoud Gimie
(74) *Attorney, Agent, or Firm*—Nixon & Vanderhye P.C.

(57) ABSTRACT

A crank angle sensor outputs a crank angle signal pulse every when a crankshaft rotates a predetermined crank angle. A time period sufficient for rotating a crankshaft between adjacent crank angle signal pulses is measured. The time period is referred to as a rotating time period. A next rotating time period between pulses including a next required ignition timing is estimated based on the rotating time period measured at a time when an engine speed is lower than a predetermined value. Then, a start timing at which a primary current begins to be supplied is set based on the next timing period.

6 Claims, 6 Drawing Sheets

|  |  | 30°CA | | | | | |
|---|---|---|---|---|---|---|---|
|  |  | No. 1 | No. 2 | No. 3 | No. 4 | No. 5 | No. 6 |
| T30 (ms) | 100 | 1.2 | -- | -- | -- | -- | -- |
|  | 80 | 1.2 | -- | -- | -- | -- | -- |
|  | 60 | 1.2 | -- | -- | -- | -- | -- |
|  | 40 | 1.1 | -- | -- | -- | -- | -- |
|  | 20 | 1.05 | -- | -- | -- | -- | -- |
|  | 10 | 1 | -- | -- | -- | -- | -- |
|  | 0 | 1 | -- | -- | -- | -- | -- |

IGNITION TIMING CONTROLLER FOR INTERNAL COMBUSTION ENGINE

CROSS REFERENCE TO RELATED APPLICATIONS

This application is based on Japanese Patent Application No. 2004-270868 filed on Sep. 17, 2004, the disclosure of which is incorporated herein by reference.

FIELD OF THE INVENTION

The present invention relates to an ignition timing controller for an internal combustion engine. The ignition timing controller controls an ignition timing of an internal combustion engine by controlling a primary current applied to a spark plug.

BACKGROUND OF THE INVENTION

Generally, the primary current is applied to a primary coil of an ignition coil for a predetermined time period. When the primary current is stopped, high voltage is generated in a secondary coil to generate a spark. The timing when the primary current stops to be supplied corresponds to the ignition timing.

The ignition timing controller described in JP-4-362275A shows that a crank angle sensor outputs a crank angle signal pulse every 30° CA of the crank shaft, and that a time period for rotating the crankshaft 30° CA is measured. The primary current begins to be applied to the primary coil at the output timing of the crank angle signal pulse that is just before the top dead center. The primary current has been applied for a period that is obtained by multiplying the time period for rotating the crank shaft 30° CA by a predetermined constant (for example, ¼).

However, when the speed of the engine is extremely low, the fluctuation of the engine speed is increased, so that the ignition timing is hardly controlled precisely according to the fluctuation of the engine speed. The variation of the energizing period of the primary coil is increased, so that the ignition timing is dispersed.

SUMMARY OF THE INVENTION

The present invention is made in view of the foregoing matter and it is an object of the present invention to provide an ignition timing controller which enhance an accuracy of an ignition timing.

According to an ignition timing controller of the present invention, a measuring means measures a time period sufficient for rotating a crankshaft between adjacent crank angle signal pulses. The time period is referred to as a rotating time period. An estimating means estimates a next rotating time period between pulses including a next required ignition timing based on the rotating time period measured by the measuring means at a time when an engine speed is lower than a predetermined value. And a setting means sets a start timing at which a primary current begins to be supplied based on the next timing period.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Figure 1:
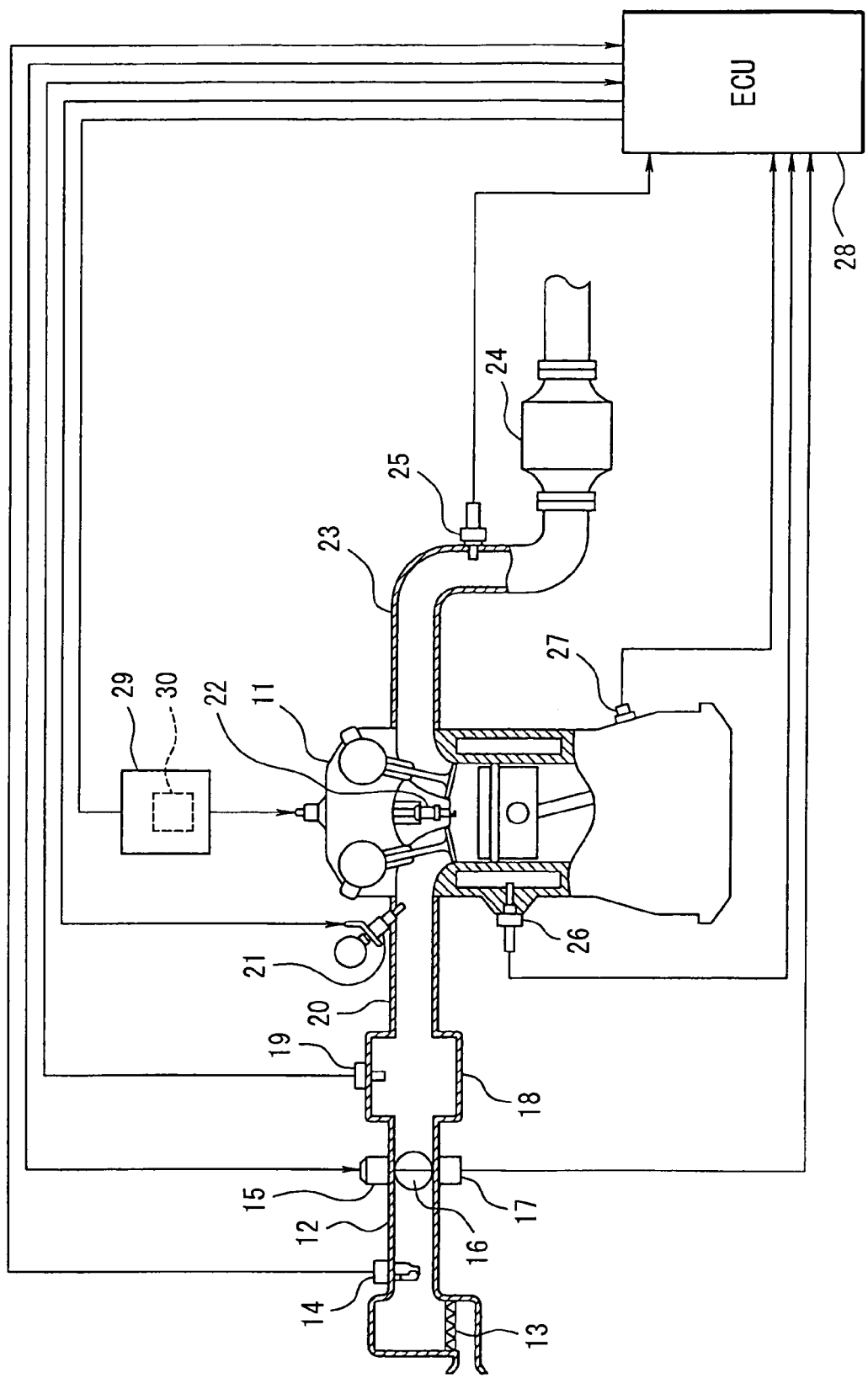
FIG. 1 is a schematic view of an engine control system according to a first embodiment.

Embodiments of the present invention will be described hereinafter with reference to the drawings.

First Embodiment

Referring to FIGS. 1 to 6, a structure of an engine control system is described hereinafter. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position are provided downstream of the air flow meter 14.

A surge tank 18 including an intake air pressure sensor 19 is provided down steam of the throttle valve 16. The intake air pressure sensor 19 detects intake air pressure. An intake manifold 20 is connected to the surge tank 18. A fuel injector 21 is mounted on the intake manifold 20 at a vicinity of an intake air port. A spark plug 22 is mounted on a cylinder head of the engine 11 corresponding to each cylinder to ignite air-fuel mixture in each cylinder. Each spark plug 22 is electrically connected to the ignition timing controller 29. The ignition timing controller 29 supplies a primary current to a primary coil of an ignition coil 30 for a predetermined duration, and supplies a high voltage to the spark plug 22 to generate a spark. The high voltage is generated in a secondary coil when an electrifying of the primary current is stopped. Thus, the spark plug ignites at the time when a predetermined duration has passed since the primary current is supplied. The ignition timing corresponds to the timing in which the electrifying of the primary current is stopped.

An exhaust pipe 23 of the engine 11 is provided with a three-way catalyst 24 purifying CO, HC, and NOx in the exhaust gas. An exhaust gas sensor 25 (an air-fuel ratio sensor, an oxygen sensor) disposed upstream of the three-way catalyst 24 detects air-fuel ratio of the exhaust gas.

A coolant temperature sensor 26 detecting a coolant temperature and a crank angle senor 27 outputting a pulse signal every predetermined crank angle (for example, 30° CA) of a crankshaft of the engine 11 are disposed on a cylinder block of the engine 11. The crank angle and an engine speed are detected based on the output signal of the crank angle sensor 27.

The outputs from the above sensors are inputted into an electronic control unit 28, which is referred to an ECU hereinafter. The ECU 28 includes a microcomputer which executes an engine control program stored in a ROM (Read Only Memory) to control a fuel injection amount based on an engine running condition and an ignition timing by controlling the primary current to the ignition coil 30.

Figure 4:
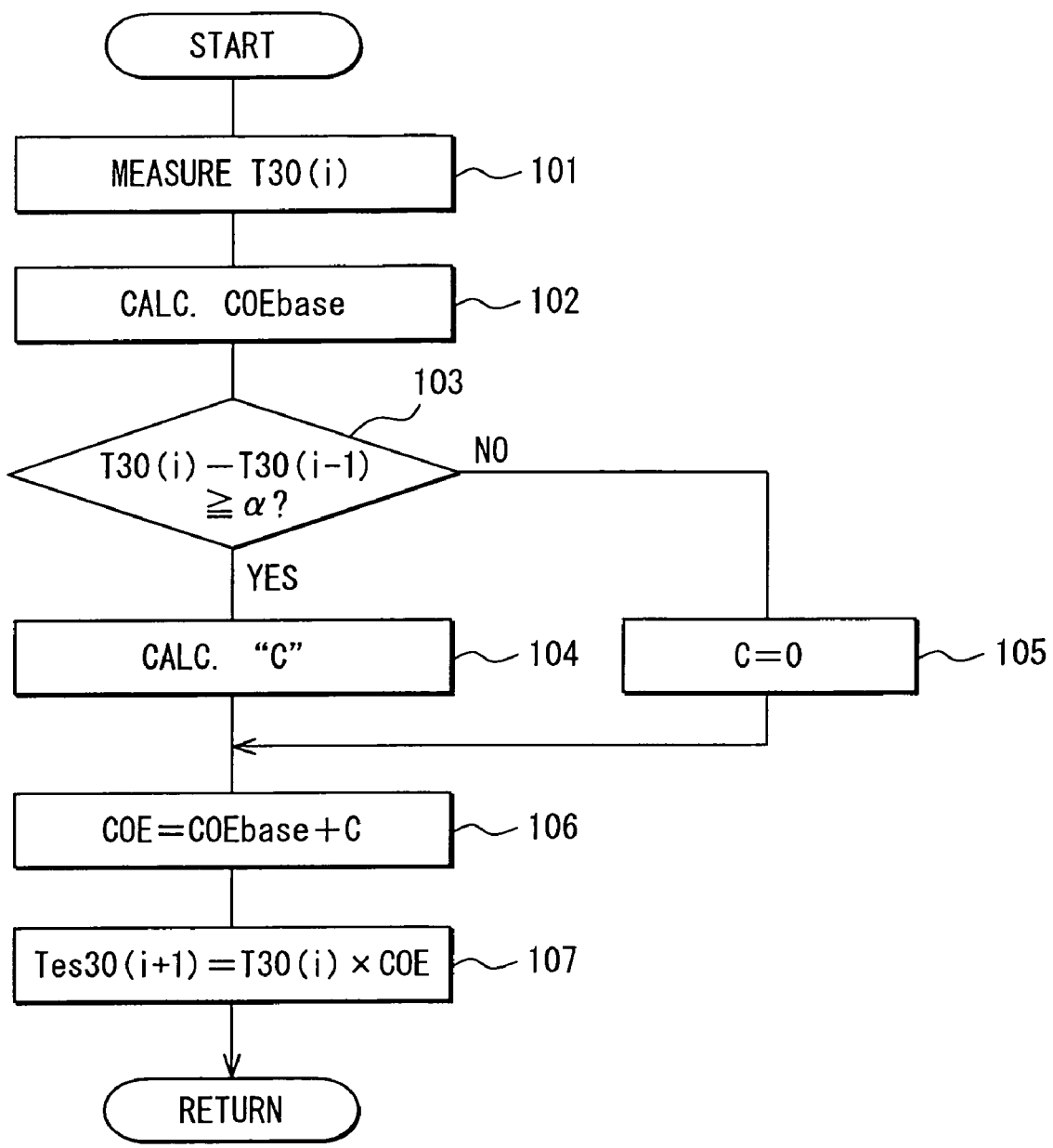
FIG. 4 is a flowchart showing a 30° CA rotation time period estimation program.
Figures 5, 6:
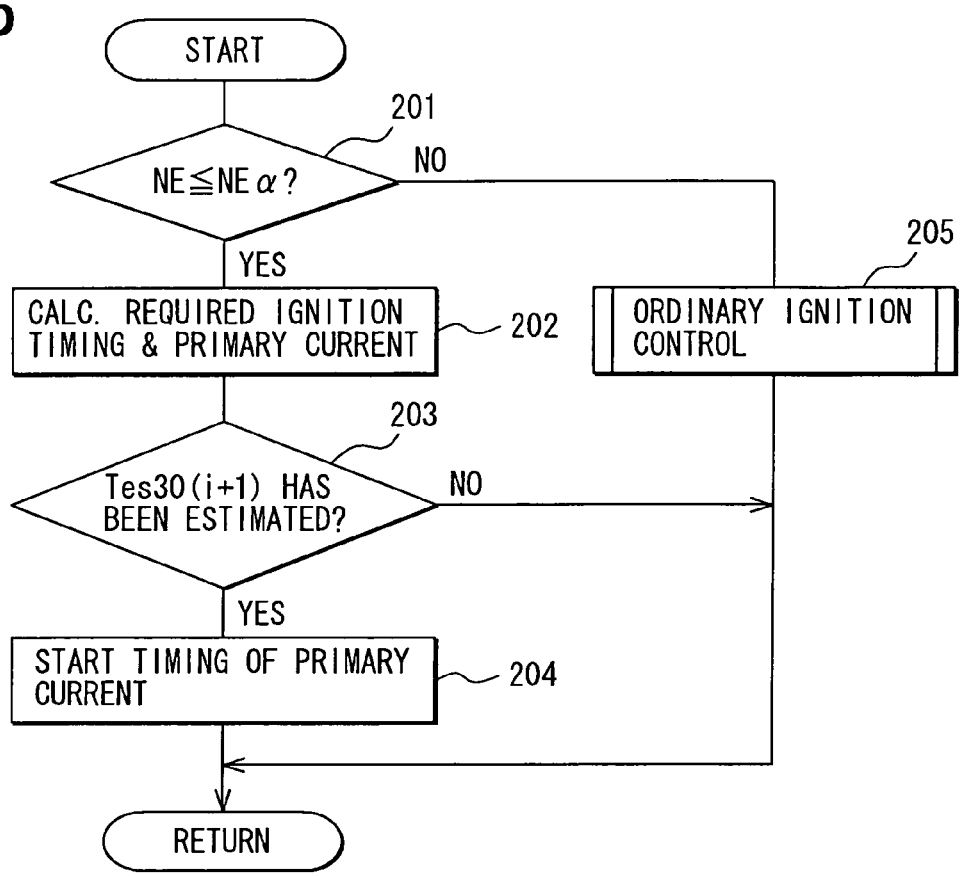
FIG. 5 is a flowchart showing an ignition control program.
FIG. 6 is a map schematically showing a base coefficient.

The ECU 28 executes each program shown in FIGS. 4 and 5 to establish a start timing in which the primary current is supplied to the ignition coil 30 when the speed of the engine 11 is extremely low, such as starting of the engine.

Figure 2:
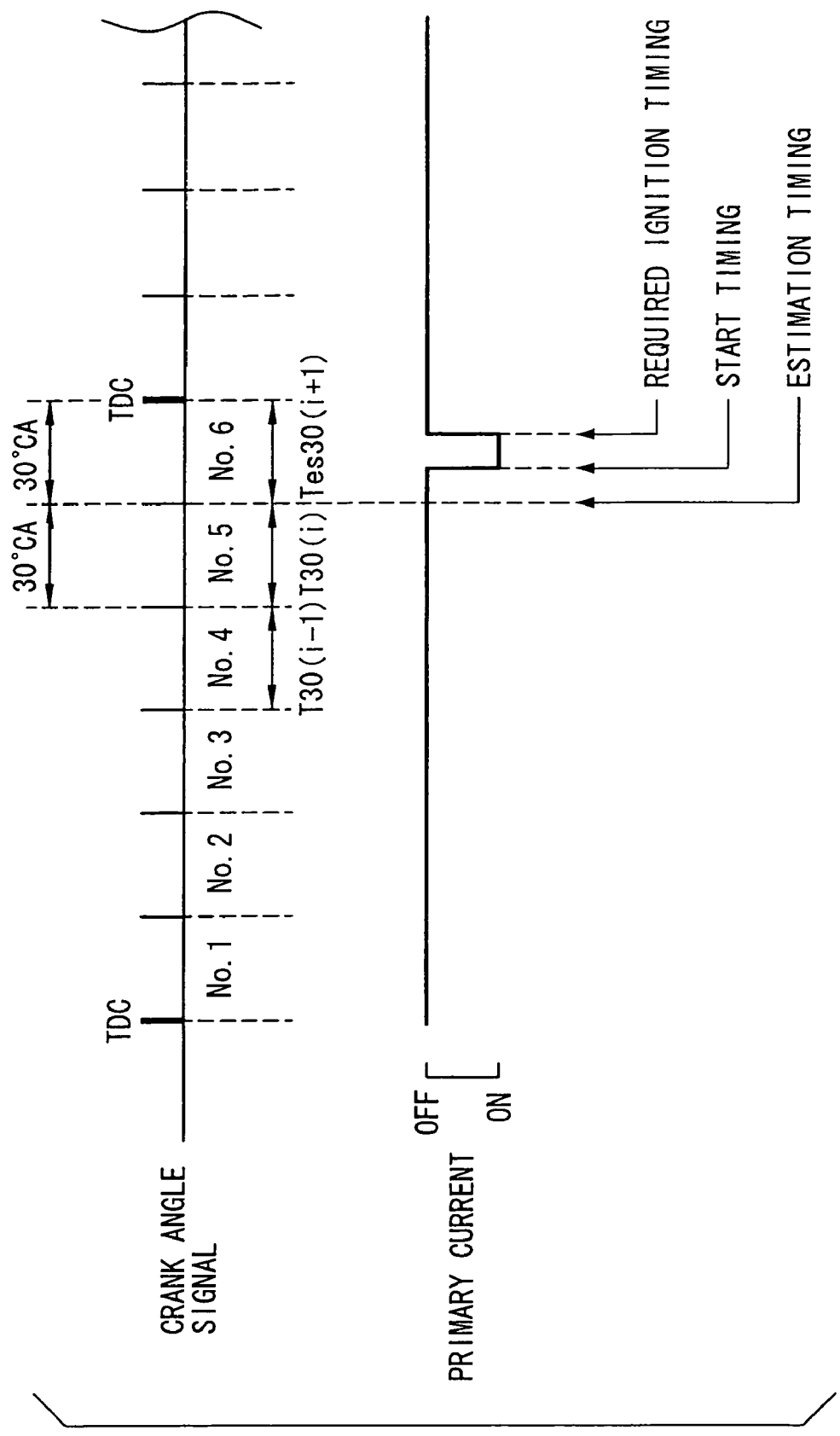
FIG. 2 is a time chart for explaining an ignition timing according to the first embodiment.
Figure 3:
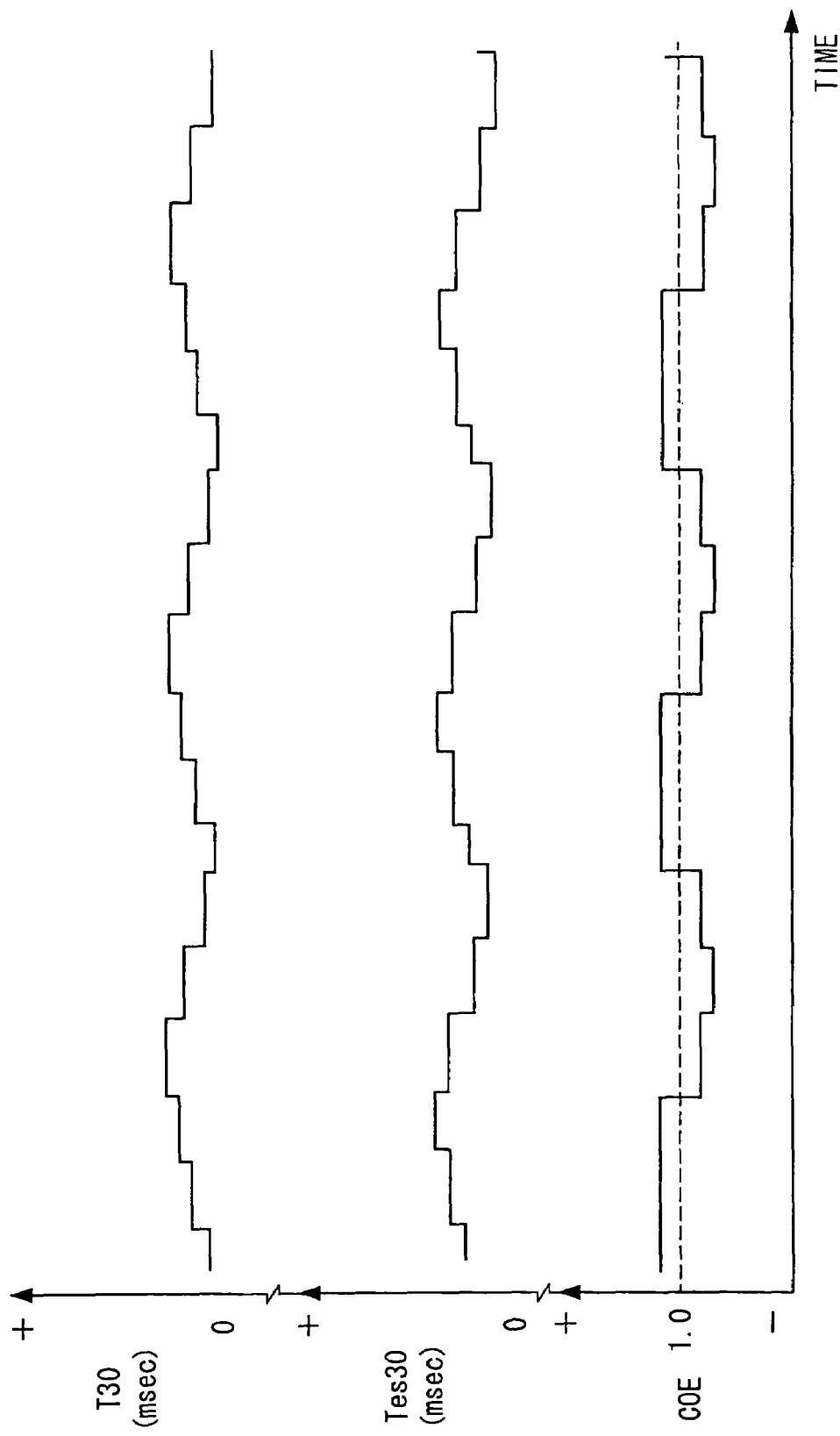
FIG. 3 is a time chart showing a time period T30 (i), an estimated time period Tes30 (i+1), and a coefficient COE.

As shown in FIG. 2, which is a time chart, a time period T30 (i) is measured every when a crankshaft rotates 30° CA. The time period T30 (i) is a time period in which the crankshaft rotates 30° CA. The crank angle 30° is measured and defined by crank angle signal pulses outputted from the crank angle sensor 27. As shown in FIG. 3, a coefficient COE is determined according to the measured time period T30 (i), and a next time period Tes30 (i+1) is estimated based on a following equation.

$$Tes30(i+1) = T30(i) \times COE$$

As shown in FIG. 2, when the next time period Tes30 (i+1) is estimated at the end of the 30° CA which is just before successive 30° CA including a next required ignition timing, the start timing in which the primary current is supplied to the ignition coil 30 is established based on the estimated next time period Tes30 (i+1). Since the rotational angle until the successive 30° CA can be measured on a time axis by estimating the next time period Tes30 (i+1), a rotational position prior to the required ignition timing is derived to set the rotational position as a start timing of the primary current. The start timing of the primary current represents the start timing in which the primary current is supplied to the ignition coil 30.

Referring to FIGS. 4 and 5, each program for controlling the ignition timing is described hereinafter.

(Estimation of Time Period for Rotating a Crankshaft 30° CA)

A program shown in FIG. 4 is executed every when the crank angle signal is outputted from the crank angle sensor 27. In this embodiment, this program executed every 30° CA. In step 101, the time period T30 (i) is measured based on an output interval of angle sensor signal from the crank angle sensor 27.

In step 102, a base coefficient COEbase, which corresponds to the measured time period T30 (i), is derived based on a base map shown in FIG. 6.

In this base map, the base coefficient COEbase is determined every 30° CA range (No. 1–No. 6). This base map is established based on design data and experimental data, and is stored in the ROM. The base coefficient COEbase is a ratio between the measured time period T30 and the estimated time period in each 30° CA range (No. 1–No. 6). The measured time period T30 is obtained when the engine 11 is driven only by a starter with no combustion in a cylinders.

After base coefficient COEbase is obtained, the procedure proceeds to step 103 in which a determination is made as to whether a difference between the measured time period T30 (i) and the previous measured time period T30 (i−1) is larger than or equal to a predetermine value α. When the answer is Yes in step 103, the computer determines the base coefficient COEbase should be corrected due to a fluctuation of the engine speed, and the procedure proceeds to step 104 in which a coefficient correction value "C" is calculated based on the difference between the time period T30 (i) and the time period T30 (i−1).

When the answer is No in step 103, the procedure proceeds to step 105 in which the coefficient correction value "C" is set to zero.

After the coefficient correction value "C" is calculated, the procedure proceeds to step 106 in which the final coefficient COE is calculated by adding the coefficient correction value "C" to the base coefficient COEbase.

$$COE = COEbase + C$$

Then, the procedure proceeds to step 107 in which the measured time period T30 (i) is multiplied by the final coefficient COE to derive the next estimated time period Tes30 (i+1).

$$Tes30(i+1) = T30(i) \times COE$$

(Control of Ignition)

FIG. 5 shows an ignition timing control program which is executed every output timing of the crank angle signal (30° CA). In step 201, a determination is made whether the engine speed NE is lower than or equal to a predetermined value NEα, that is, whether the engine speed is extremely low. When the answer is No in step 201, the procedure proceeds to step 205 in which a normal ignition control is conducted.

When the answer is Yes in step 201, the procedure proceeds to step 202 in which the required ignition timing Tri and the electrifying time period T1 of the primary current are calculated.

Then, the procedure proceeds to step 203 in which a determination is made as to whether the next estimated time period Tes30 (i+1) in 30° CA including the next required ignition timing Tri has been estimated. When the answer is Yes in step 203, the procedure proceeds to step 204 in which the start timing of the primary current is determined based on the next estimated time period Tes30 (i+1)

According to the first embodiment, the next estimated time period Tes30 (i+1) is estimated based on the time period T30 which is measured from the output interval of the crank angle signal pulses. Since the rotational angle until the successive 30° CA can be measured on a time axis by estimating the next time period Tes30 (i+1), a rotational position prior to the required ignition timing is derived to set the rotational position as the start timing of the primary current. Thus, even when the speed of the engine is extremely low, the start timing of the primary current is precisely established to control the ignition timing.

In the first embodiment, the next estimated time period Tes30 is derived using the coefficient COE, so that the next estimate time period Tes30 is precisely calculated.

Second Embodiment

Figure 7:
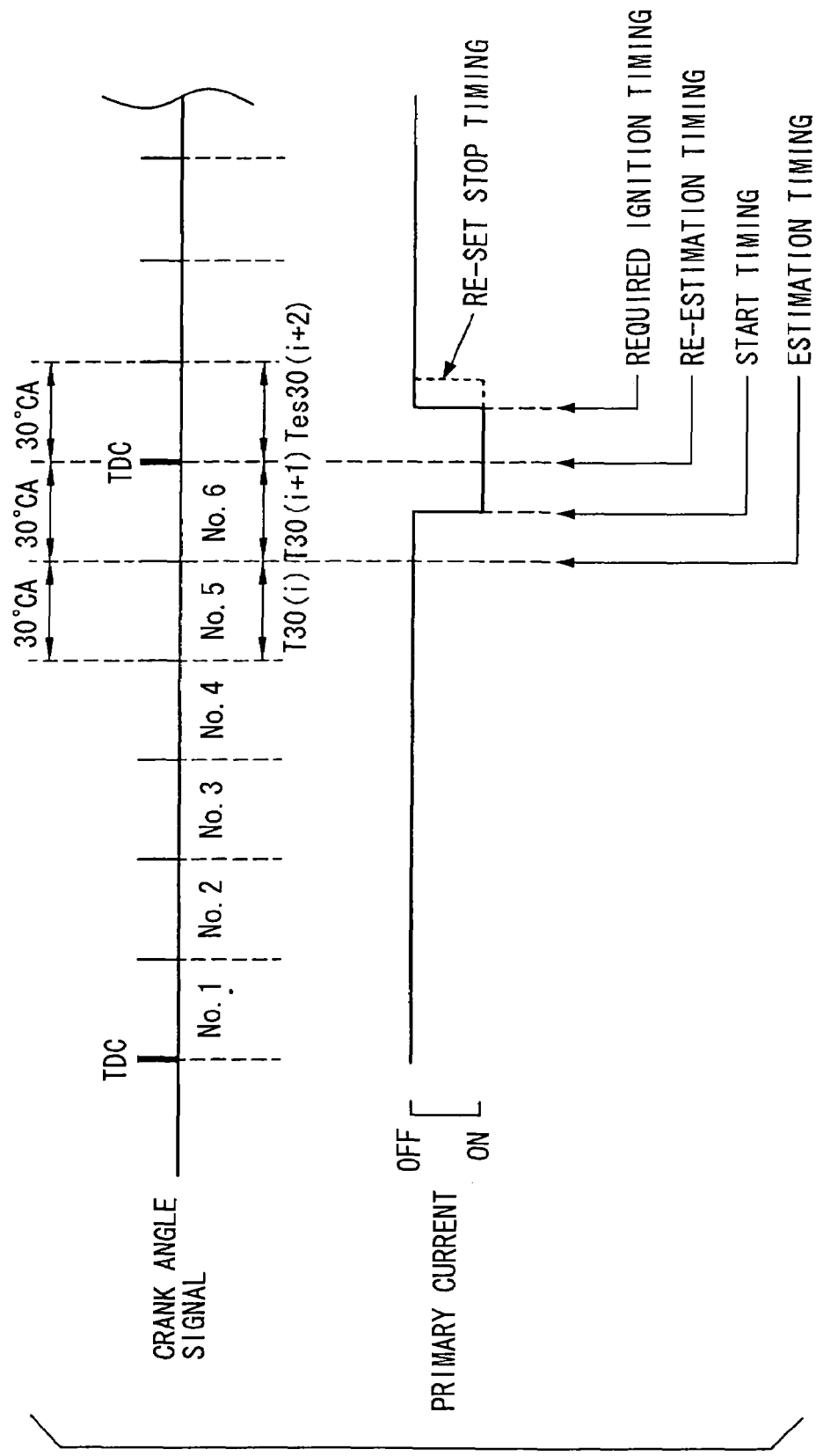
FIG. 7 is a time chart for explaining an ignition timing according to a second embodiment.

Referring to FIG. 7, a second embodiment of the present invention is described hereinafter.

Due to the required ignition timing and the electrifying period of the primary current, the start timing of the primary current may be established across both the 30° CA including the required ignition timing and the previous 30° CA thereof. When the start timing of the primary current is calculated at the end of 30° CA, the calculating timing may be delayed relative to a proper start timing of the primary current.

According to the second embodiment, when time period T30 (i) of 30° CA which is two range before the last 30° CA including the required ignition timing is measured, the next time period Tes30 (i+1) is estimated based on the time period T30 (i). And then, the estimated time period Tes30 (i+2) after the last time period T30 (i+1) is estimated based on the last time period T30 (i+1) in order to calculate the start timing of the primary current.

$$Tes30\ (i+2) = \{T30(i) \times COE(i)\} \times COE\ (i+1)$$
$$= T30\ (i+1) \times COE\ (i+1)$$

COE (i) and COE (i+1) are coefficients for estimating the time period T30 (i+1) and the time period Tes30 (i+2) respectively.

When the time period T30 (i+1) is measured, the next estimated time period T30 (i+2) is re-estimated and a stop timing of the primary current is re-set. The stop timing of the primary current represents a timing at which the electrifying of the primary current is terminated.

According to the second embodiment, since the estimated time period T30 (i+1) is re-estimated at the time when the time period T30 (i+1) is measured, the stop timing of the primary current is re-established to enhance a control accuracy of the ignition timing.

In the first and second embodiments, the start timing of the primary current is determined based on the estimated time period Tes30. Alternatively, the stop timing of the primary current may be determined based on the estimated time period Tes30. In this case, the start timing of the primary current may be determined according to the stop timing, or may be fixed without respect to the start timing. Even when the engine speed is extremely low, the ignition timing can be arbitrarily controlled and the dispersion of the ignition timing is restrained.

What is claimed is:

1. An ignition timing controller controlling a primary current supplied to an ignition coil which receives high voltage so that a spark plug of an internal combustion engine generates spark, the ignition timing controller comprising:
    a crank angle sensor outputting a crank angle signal pulse every when a crankshaft rotates a predetermined crank angle;
    a measuring means for measuring a time period sufficient for rotating a crankshaft between adjacent crank angle signal pulses, the time period referred to as a rotating time period;
    an estimating means for estimating a next rotating time period between pulses including a next required ignition timing based on the rotating time period measured by the measuring means at a time when an engine speed is lower than a predetermined value; and
    a setting means for setting a start timing at which a primary current begins to be supplied based on the next timing period.

2. The ignition timing controller according to claim 1, further comprising
    a memory means storing a map of a coefficient for estimating the next rotating period between pulses including the next required ignition timing based on the rotating time period in which the crankshaft is rotated by a stator motor without any combustion of the internal combustion engine, wherein
    the estimating means selects the coefficient from the map, which corresponds to the rotating time measured by the measuring means, in order to estimate the next rotating time period by means of the coefficient.

3. The ignition timing controller according to claim 2, wherein
    the estimating means corrects the coefficient based on a relationship between a previous value and a current value of the rotating time period.

4. The ignition timing controller according to claim 1, wherein
    the estimating means estimates a first rotating time for a first crank angle which is just before a second crank angle including the next required ignition timing based on the rotating time measured by the measuring means, and estimates a second rotating time for the second crank angle based on the first rotating time.

5. The ignition timing controller according to claim 4, wherein
    the estimating means re-estimates the second rotating time at a time when the first rotating time is measured by the measuring means.

6. An ignition timing controller controlling a primary current supplied to an ignition coil which receives high voltage so that a spark plug of an internal combustion engine generates spark, the ignition timing controller comprising:
    a crank angle sensor outputting a crank angle signal pulse every when a crankshaft rotates a predetermined crank angle;
    a measuring means for measuring a time period sufficient for rotating a crankshaft between adjacent crank angle signal pulses, the time period referred to a rotating time period;
    an estimating means for estimating a next rotating time period between pulses including a next required ignition timing based on the rotating time period measured by the measuring means at a time when an engine speed is lower than a predetermined value; and
    a setting means for setting a stop timing at which a primary current ends to be supplied based on the next timing period.

* * * * *